(12) United States Patent
Hoekstra

(10) Patent No.: US 6,553,360 B1
(45) Date of Patent: Apr. 22, 2003

(54) SOFTWARE-BASED PROBLEM-RESOLUTION PRODUCTION SYSTEM WITH STANDARDIZED INFORMATION PROVIDERS & SOLUTION INTERPRETERS

(75) Inventor: Matthew E. Hoekstra, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/455,100

(22) Filed: Dec. 6, 1999

(51) Int. Cl.$^7$ ................................................ G06F 15/18
(52) U.S. Cl. ................................. 706/47; 706/46
(58) Field of Search ..................................... 706/45–47

(56) References Cited

U.S. PATENT DOCUMENTS

| | | | | |
|---|---|---|---|---|
| 4,866,635 A | * | 9/1989 | Kahn et al. .................... | 706/46 |
| 5,761,380 A | * | 6/1998 | Lewis et al. ................... | 706/47 |
| 5,809,282 A | * | 9/1998 | Cooper et al. ............... | 709/226 |
| 5,944,839 A | * | 8/1999 | Isenberg ....................... | 714/26 |

* cited by examiner

*Primary Examiner*—John A. Follansbee
*Assistant Examiner*—Michael B. Holmes
(74) *Attorney, Agent, or Firm*—Kenyon & Kenyon

(57) ABSTRACT

A problem-resolution software system is organized into a "solution cube" which interacts with a problem-resolution framework consisting of a production-system engine. The solution cube incorporates production-system rules, "solution interpreters" for implementing chosen solutions, and a common interface mechanism for standardizing the interaction between the solution interpreters and the production system. The solution cube may also incorporate "information providers" for obtaining information from specific information sources, and another common interface mechanism for standardizing the interaction between the information providers and the production system. Each solution cube, which is a uniquely identifiable problem-resolution object, is organized into sub-units of one or more "knowledge elements," each of which may be reusable by other solution cubes. The knowledge elements operate to add semantic information to the CIM data model which defines the components of a computing environment in terms of objects. The knowledge elements, by using the production system rules to set restrictions and dependencies on the properties of CIM objects, specify the "preferred state" of a given computer system and performs necessary actions based on the rules to maintain the preferred state, which rules may request additional information for the purpose of clarifying the context of the initial CIM data model by using heuristics and reasoning. "Information providers," each of which is a provider module that retrieves information from a specific information source, facilitate a streamlined channeling of information to the production system by sharing a common interface with the production system, thereby allowing implementation of a generalized query mechanism in the production system regardless of the actual physical implementation of the information source. In addition, "solution providers" are provided to interpret a requested solution, perform it, and notify the production system when the solution has completed, as well as notify the production system of any results. Because a common interface is used to request any one of the available solutions, the common interface allows developers to implement a generalized solution mechanism in the production system regardless of the actual physical implementation of the solution provider.

28 Claims, 5 Drawing Sheets

SOFTWARE-BASED PROBLEM-RESOLUTION PRODUCTION SYSTEM WITH STANDARDIZED INFORMATION PROVIDERS & SOLUTION INTERPRETERS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention is related generally to a software-based system and methodology for providing diagnoses and solutions to problems encountered by a given system. More particularly, the present invention is directed to a software-based system and methodology incorporating a problem-resolution production system, solution interpreters for implementing chosen solutions, and information providers, in which the solution interpreters and information providers interface with the problem-resolution production system via standardized interface mechanisms.

BACKGROUND OF THE INVENTION

A "problem-resolution production system" (or simply referred to hereinafter as "production system") is a software system and methodology widely understood in the artificial intelligence field of computer science. At the most basic level of abstraction, a production system refers to a problem-resolution software engine and a set of rules which are written to reach some conclusion upon being operated on by the problem-resolution software engine, which is well known in the art. Each rule may be quite simple on its own, but when multiple rules are aggregated, these rules can form a quite complex system. A very simple example of a set of rules which may be contained in a production system is illustrated below in Table 1:

TABLE 1

| | |
|---|---|
| Rule 1: | If person 1 is the parent of person 2, and person 1 is also the parent of person 3, and person 2 is female, then person 2 is the sister of person 3. |
| Rule 2: | If person 1 is the parent of person 2, and person 3 is the sister of person 1, then person 3 is the aunt of person 2. |

Many simple rules such as the ones mentioned above can be added to the production system. Once the rules have been written, then the production system is initialized with a set of facts such as the ones exemplified below in Table 2:

TABLE 2

| | |
|---|---|
| Fact 1: Jim is Male | Fact 6: Jim is the parent of Jill |
| Fact 2: Jill is Female | Fact 7: Jim is the parent of Sam |
| Fact 3: Sally is Female | Fact 8: Sam is the parent of Jeff |
| Fact 4: Sam is Male | Fact 9: Sam is the parent of Sally |
| Fact 5: Jeff is Male | |

From this initial set of facts, and the rules previously mentioned above, the production system can infer several things: a) Jill is Sam's Sister; b) Sally is Jeff's Sister; and c) Jill is the aunt of both Sally and Jeff. More rules could be added to generate additional inferences, e.g., rules regarding grandfathers, cousins, etc.

In practical applications, production systems can be used to diagnose and solve sets of problems encountered by a computer system, for example. Given rules about a specific topic such as how to diagnose and solve problems related to printing a document from a computer system, for example, facts about the current state of the computer system can be entered into the production system. The production system then applies the relevant rules to determine if there is any problem, and if so, determine the best method for solving the problem.

While the above-described production system seems simple enough, several fundamental issues arise in streamlining and maximizing the versatility of the production system. The first issue is how to channel information about the state of the monitored computer system to the production system as a set of facts packaged in a standardized format. In addressing this issue, it is helpful to explore the concept of the Common Information Model ("CIM"), which was developed by a computer-industry consortium called the Desktop Management Task Force ("DMTF") in an effort to facilitate uniform representation of computer-system objects in various operating systems. Simply put, CIM is a model that defines the components of a computing environment in terms of objects. Using CIM, the computer-system objects can be queried using SQL- like database queries. SQL, or "Simple Query Language," is a common language used to make database queries, and an example of an SQL query would be "Select Name From Users Where ID>30," which query would find the names of all users in a database who have user IDs greater than 30. An example of a CIM query is "Select *from CIM_LogicalDiskDrive," which query would return references to objects representing each memory disk drive in a particular computer system. These objects contain properties that define various aspects of the disk. In this example, the CIM_LogicalDiskDrive has properties such as DeviceID, FreeSpace and Size. Many other objects may be represented in CIM, such as the processor, system BIOS ("Basic Input/Output System"), operating system type, running processes, etc. One major drawback of CIM, however, is that CIM is a data model with no semantic notion and does not provide for manipulation of the objects in context. Even in an implementation of CIM which allows attachment of "methods" (which contain executable functions) to CIM objects, a given "method" will execute a called function without discrimination or context because the "method" is based on traditional Object Oriented ("OO") technology.

Once the appropriate rules have been applied and a solution for the problem has been found, the next issue is implementation of the solution. Ideally, it would be desirable to achieve an implementation whereby once the optimal solution has been determined, the chosen solution is immediately and automatically implemented. However, there are many different types of solutions which may be proposed, and there is a need for an interface mechanism to handle various types of solutions that may be proposed by a given production system.

Existing methods of dealing with this issue involve writing program codes which are directly tied to the details of a given production system. An obvious disadvantage of this approach is that the person implementing the program codes must understand the details of the relevant internal operations of the production system in order to generate an appropriate action as directed by the production rules. Furthermore, because an interface mechanism is "customized" for a particular production system, different production systems require different interface mechanisms.

SUMMARY OF THE INVENTION

The present invention provides a software-based system and methodology incorporating a problem-resolution production system, a mechanism for channeling information to the production system in a standardized format, "information providers" that retrieve information from specific information sources, and "solution interpreters" for implementing chosen solutions. In accordance with the present invention, the above-mentioned software system may be organized into a "solution cube" which interacts with a problem-resolution framework to identify and solve problems encountered by a given system, e.g., a host computer system. The solution cube, which is a uniquely identifiable problem-resolution object, may be constructed via a method, referred to as a "cube builder." Each "solution cubes" consists of one or more "knowledge elements." The knowledge element may in turn consist of: state strategies (e.g., what to monitor, etc.); logic governing the problem resolution strategies in the form of rules; and actionable components (scripts, executable, command lines, etc.). Each of the individual "knowledge elements" that make up a given solution cube is reusable by other solution cubes, and individual components may be added incrementally to achieve a desired aggregation for a particular solution cube. Furthermore, each solution cube is uniquely identified through a GUID ("Globally Unique ID").

The above-mentioned knowledge elements operate to add semantic information to the CIM data model which defines the components of a computing environment in terms of objects. The knowledge elements define the semantics in the production system rules and rule consequents (i.e., actions to be performed), and by using the production system rules to set restrictions and dependencies on the properties of CIM objects, the "preferred state" of a given computer system may be specified. The software-based methodology according to the present invention monitors the CIM objects and performs necessary actions based on the rules contained in the knowledge elements to maintain the preferred state, which rules may request information for the purpose of clarifying the context of the initial CIM data model by using heuristics and reasoning.

In order to facilitate a streamlined channeling of information to and from the production system, the present invention implements the concept of "information providers," each of which is a provider module that retrieves information from a specific information source. All information providers share a common interface with the production system, thereby allowing implementation of a generalized query mechanism in the production system regardless of the actual physical implementation of the information source. From the production system, an "information request" is issued when application of rules requires particular information. Associated with a given information source is a particular type of information request, and when a particular information request is asserted, the appropriate information provider is loaded and the specified information is retrieved. The retrieved information is then asserted into the production system as a set of facts. "Information providers" may be incorporated within a given solution cube or provided as a module separate from the solution cube.

In yet another aspect of the present invention, the concept of a "solution interpreter" (or "solution provider") is implemented. A solution interpreter is a software platform that can interpret a requested solution, perform it, and notify the production system when the solution has completed, as well as notify the production system of any results. The production system loads an appropriate solution interpreter and uses a common interface to request that a particular solution be executed. The common interface allows developers to implement a generalized solution mechanism in the production system regardless of the actual physical implementation of the solution interpreter. "Solution Interpreters" may be incorporated within a given solution cube or provided as a module separate from the solution cube.

The "cube builder" methodology enables a user to package production-rules files and other files inputted by a user into "knowledge elements," which are in turn combined to form a solution cube for maintaining a predefined preferred state of a system, e.g., a computer system. The cube builder methodology may include the following steps: 1) the user selects a problem domain for which a solution cube will be constructed; 2) the user defines key concepts related to the selected problem domain; 3) the user defines a set of production rules for a knowledge element; 4) different types of information providers by which the production rules for the knowledge element may query information from various information sources are defined and stored; 5) the user defines one or more solutions for the knowledge element; 6) the user defines "solution interpreters" (or "solution provider") for interpreting and executing the solutions defined in step 5); 6) Steps 1)–5) may be repeated to create additional knowledge elements; 7) the user selects one or more defined knowledge elements and groups the selected knowledge elements to define a solution cube; 8) a unique GUID identifier is assigned to the solution cube.

The software system in accordance with the present invention may reside on any computer-readable medium, e.g., a floppy disk, a computer system's hard disk, a zip-drive disk, a CD ROM, or DVD ROM.

DETAILED DESCRIPTION OF THE INVENTION

Figure 1:
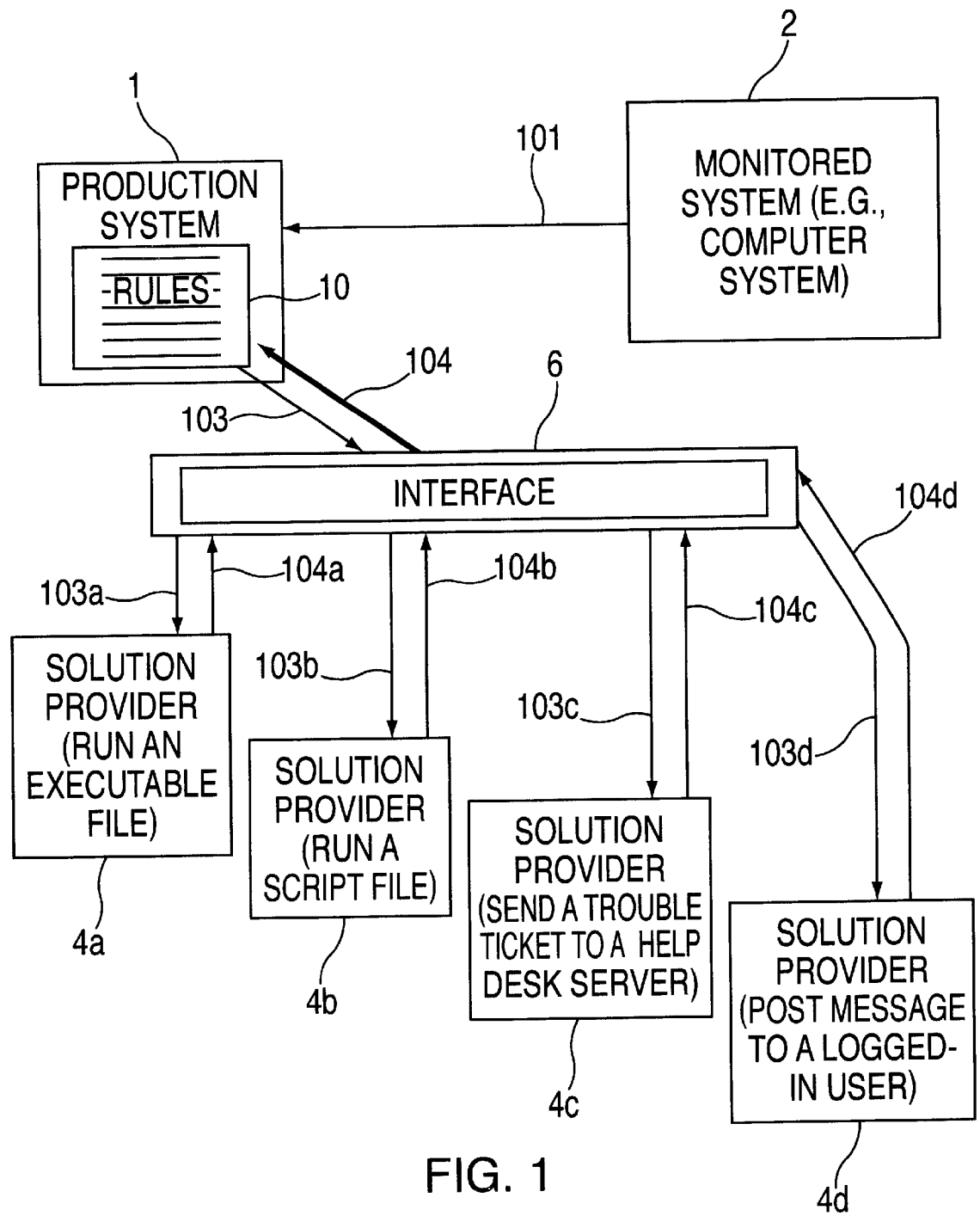
FIG. 1 is a block diagram illustrating the interactions amongst the monitored system, the production system, the solution providers and the interface in an exemplary embodiment of the software system in accordance with the present invention.

As shown in FIG. 1, an exemplary embodiment of the software system according to the present invention incorporates, among other elements, a production system 1, solution providers or interpreters 4a–4c and a common interface mechanism 6 for interacting with the production system 1. The production system 1 consists of production rules and the production-system software engine, which in turn consists of binary components, e.g., "dynamically linked libraries" (DLLS) and executable programs. The production system software engine will not be discussed in detail since its implementation is well known to those of ordinary skill in the art.

Figure 2:
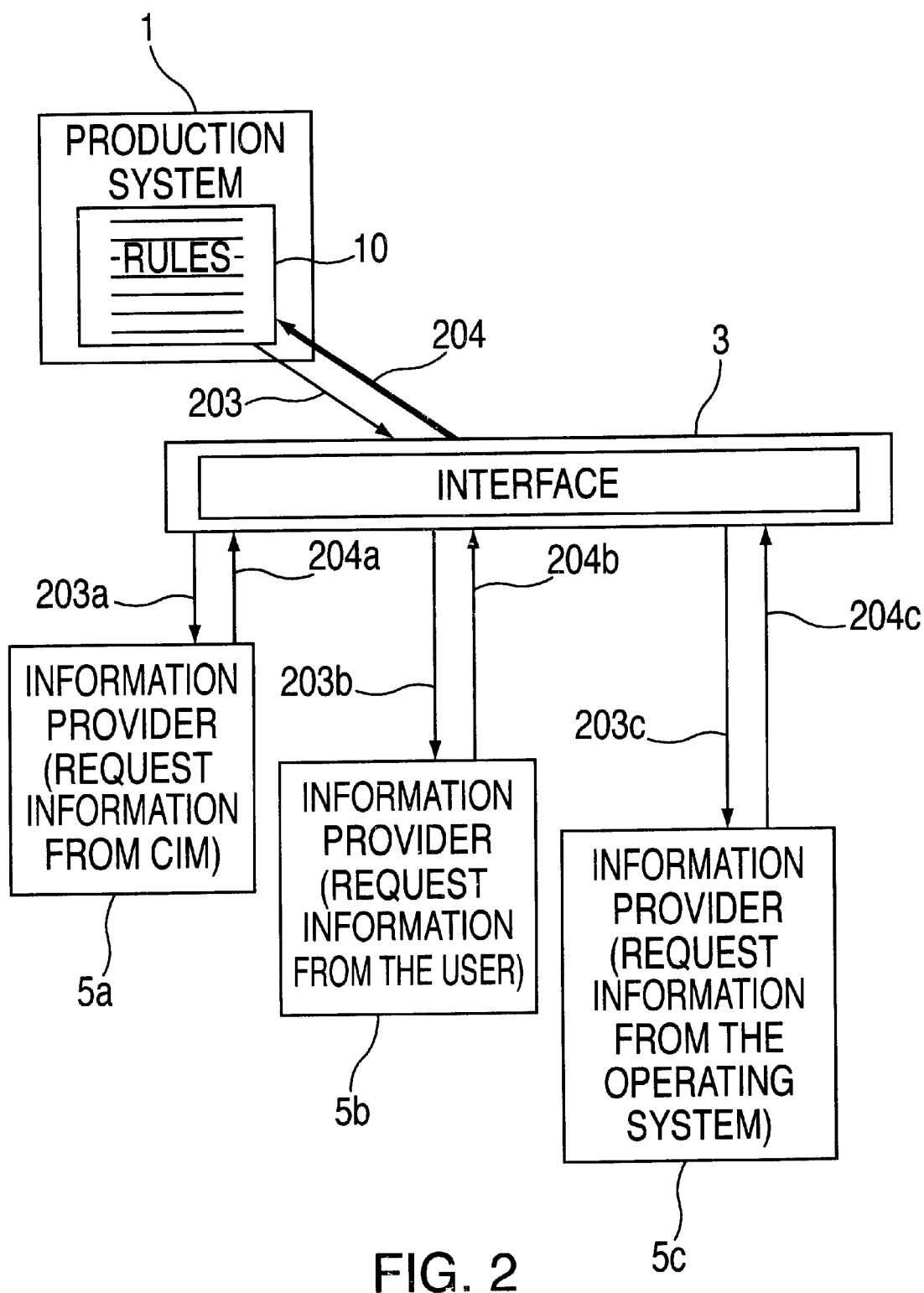
FIG. 2 is a block diagram illustrating the interactions amongst the production system, the information providers and the interface in an exemplary embodiment of the software system in accordance with the present invention.

Furthermore, as shown in FIG. 2, the exemplary embodiment of the software system according to the present invention may also incorporate information providers 5a–5c and a second common interface mechanism 3 for the information providers. It should be noted that the number of solution interpreters and information providers shown in FIGS. 1 and 2 is purely exemplary, and the actual number may vary according to the needs of particular applications.

Before going into detailed explanation of the operations of, and interactions amongst, the various components of the problem-resolution software system illustrated in FIGS. 1 and 2, which detailed explanation will follow in the description sections entitled "Information Providers" and "Solution Interpreters," it is helpful to introduce here the concepts and implementation of the "solution cube" and "cube builder" methodology in order to highlight the advantages of the overall organization of, and the method of creating, the software system in accordance with the present invention. The problem-resolution software system in accordance with the present invention may be organized into a "solution cube" which interacts with a problem-resolution framework to identify and solve problems encountered by an observed system, e.g., the host computer system. The "solution cube" is constructed via the "cube builder" methodology, and each "solution cube" is a uniquely identifiable problem resolution object, i.e., the combination of production-system rules, solution providers, information providers and the solutions implemented. In essence, the solution cube is a software module that contains all necessary elements for analyzing and solving a particular set of problems. More detailed descriptions of the solution cube and the cube builder methodology are included below.

Solution Cube

Figure 4A:
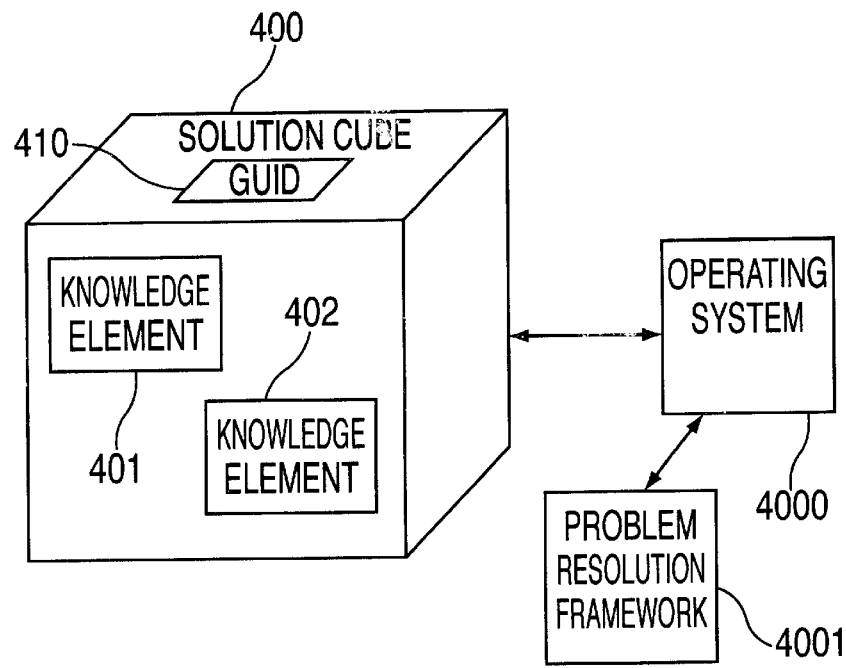
FIG. 4a is a block diagram illustrating the components of an exemplary "solution cube," as well as the interaction amongst the operating system, the solution cube and the problem-resolution framework, in accordance with the present invention.

In accordance with the present invention, each solution cube, indicated in FIG. 4A as element 400, contains one or more objects which are referred to as "knowledge elements." The exemplary solution cube 400 shown in FIG. 4a contains two knowledge elements, 401 and 402. Each knowledge element contains state strategies, i.e., what object or system to monitor, and logic governing the problem-resolution strategies in the form of production-rules file which determine if a problem has occurred, and if so, what to do about it. The knowledge element also contains the actual solutions, e.g., executable programs, scripts or command lines, which are implemented when the production-rules file asserts that a particular solution should be executed. In addition, the knowledge element may contain customized "information providers" and "solution interpreters" in the form of COM ("Component Object Model," which is explained in further detail in next section) objects.

While determining whether a problem has occurred, and figuring out the best solution, the production rules may require information from various sources such as the operating system, or from the user. As will be described in further detail in the "cube builder" section below, a user may define different types of "information providers" for obtaining information from various information sources. The customized information providers can directly query selected drivers, or call proprietary object interfaces to obtain the desired information. Furthermore, once the problem has been detected, there are a variety of types of solutions that may be applied, e.g., running an executable program or sending a "trouble ticket" to a help desk, and a user may define corresponding "solution interpreters" for interpreting and executing these solutions. In the present invention, the information providers and solution interpreters are implemented in the form of Microsoft® COM ("Component Object Model") objects. COM is a model for developing software, and using COM, software is implemented as DLLs ("Dynamically Linked Libraries") or EXEs ("executables") which expose particular interfaces such that they may be easily accessed by other programs. An example of a COM object is an "ActiveX" control that can be downloaded over the Internet. More detailed descriptions of the "information providers" and the "solution interpreter" implementations are found in subsequent sections of this specification.

Also illustrated in FIG. 4A is the interaction amongst the hardware, i.e., the operating system 4000 of the host computer, the solution cube 400 and the problem-resolution framework 4001, which may consist of the production-system engine. To begin operation, the operating system 4000 starts the executable code for the problem-resolution framework 4001, and the framework in turn loads the solution cube 400 and directs the production system to "run" the production rules in the solution cube. Next, depending on the production rules, appropriate information providers are invoked to alert the problem-resolution framework 4001 of occurrence of a particular problem condition, in response to which the framework 4001 asserts the problem condition as a fact into the production system. The production system then proposes an appropriate solution, and the solution interpreter executes the proposed solution.

While the principal component of the problem-resolution framework 4001 is the production-system engine, it is also possible to incorporate the common interface mechanisms 3 and 6, solution interpreters and information providers as parts of the problem-resolution framework, rather than as components of the solution cube. Similarly, while the problem-resolution framework 4001, i.e., the production-system engine, has been illustrated as being separate from the solution cube, the production-system engine may be incorporated as part of the solution cube along with the production-system rules. For the purposes of discussion hereunder, the terms "production system" (encompassing the engine and the rules) and "production-system instruction sets" are to be understood as being interchangeable. The solution cube may be stored on any computer-readable medium, e.g., a floppy disk, a computer system's hard disk, a zip-drive disk, a CD ROM, or DVD ROM. The solution cube may be transmitted over a network, or the solution cube may be transmitted as an attachment to an email. Similarly, the problem-resolution framework may be stored on computer-readable medium such as a floppy disk or hard disk.

Figure 4B:
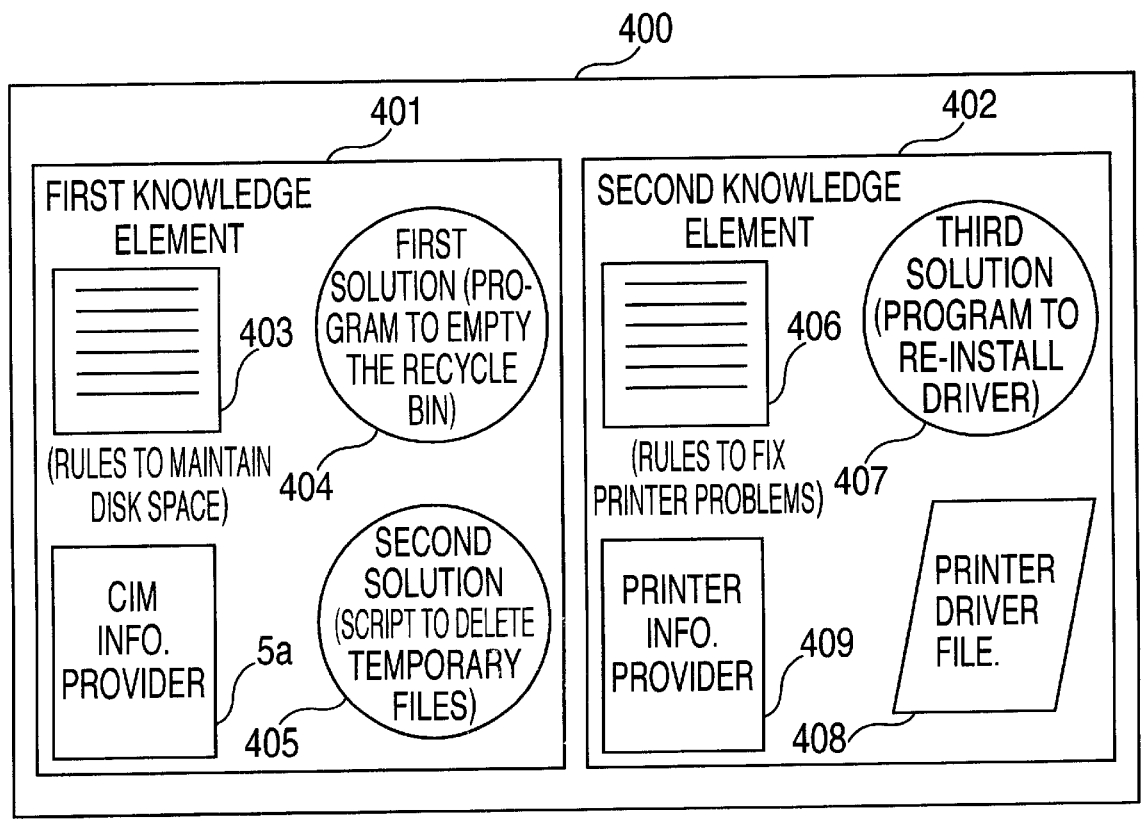
FIG. 4b is a block diagram illustrating the components of an exemplary "knowledge element" in accordance with the present invention.

An example of a solution cube having two separate knowledge elements is illustrated in connection with FIGS. 4A and 4B. It should be noted that the contents of the knowledge elements described in this example are purely exemplary and for the purpose of illustration only. A first knowledge element 401 may be written to achieve a state strategy which limits the number of files stored in a computer system's temporary directory, for example. In accordance with this goal, the exemplary knowledge element 401 may include a production-rules file 403 containing rules for maintaining a specified amount of disk space and an information provider 5a for obtaining disk information, e.g., from the CIM. Furthermore, the exemplary knowledge element 401 may include two solution files which may be called in case the specified amount of disk space is not available: a solution file 404, which is a program to empty the recycle bin; and a solution file 405, which is a script to delete temporary files. A second knowledge element 402 may be written to achieve a state strategy which verifies the availability of the default printer for printing, and if the default printer is not able to handle the print job, installing an alternate printer driver. In accordance with this goal, the knowledge element 402 has a production-rules file 406 containing rules for determining if the default printer is able to handle a print job, and if not, determining whether the assigned printer driver is effective for the default printer and finding an alternate printing solution. The knowledge element 402 also contains a solution file 407, which is a program to install alternate driver for the default printer, as well as the printer driver file 408 and an information provider 409 for obtaining printer information. The two knowledge elements 401 and 402 are then aggregated to form the solution cube 400 which monitors the system printers and checks disk space. It should be noted that, for the sake of simplicity, each of the solution files 404, 405 and 407 shown in FIGS. 4A and 4B is intended to represent a "solution object," i.e., the actual solution, and the corresponding "solution provider," i.e., the module which interprets and executes the solution. The information providers and solution providers will be discussed in further detail in subsequent sections, and the pseudo-code descriptions of the information providers 5a and 409 are contained in the detailed-description section for the information providers.

As shown in FIG. 4A, each solution cube in accordance with the present invention is uniquely identified through a GUID ("Globally Unique ID") 410 which facilitates version control and automatic detection of newer versions of a given solution cube should any modification be made to the solution cube, thereby providing a convenient mechanism for tracking upgrades. A GUID is a 128 bit number, and there are $2^{128}$ possible GUIDs which may be generated. GUIDs are generally used in conjunction with COM to uniquely identify each COM object. A GUID may be generated based on selected system attributes such as date, time and unique IDs on machine network cards or software keys. Due to the number of bits involved in a particular GUID, as well as the fact that a GUID is generated at least partly based on time, a GUID is substantially protected from duplication by another party or duplication on the same computer.

One functional advantage of utilizing the knowledge elements is that semantic information is added to the CIM data model. CIM, which is a model that defines the components of a computing system in terms of objects, enables querying of system objects, e.g., disk drive, processor, system bios, etc., by means of SQL-like database queries. However, CIM does not facilitate manipulation of the objects in context since CIM is a data model with no semantic notion. The knowledge elements, on the other hand, is implemented as a set of production-system rules and templates and encompasses it's own intelligence and decision making capabilities. This allows for an extensible reuse of knowledge elements as well as the incremental addition of new semantic information. In accordance with the present invention, the knowledge elements provide semantic information to the CIM data model by defining the semantics in production-system rules and rule consequents (i.e., actions to be performed), and by using the production-system rules to set restrictions and dependencies on the properties of CIM objects, the "preferred state" of a given computer system may be specified.

Figure 5:
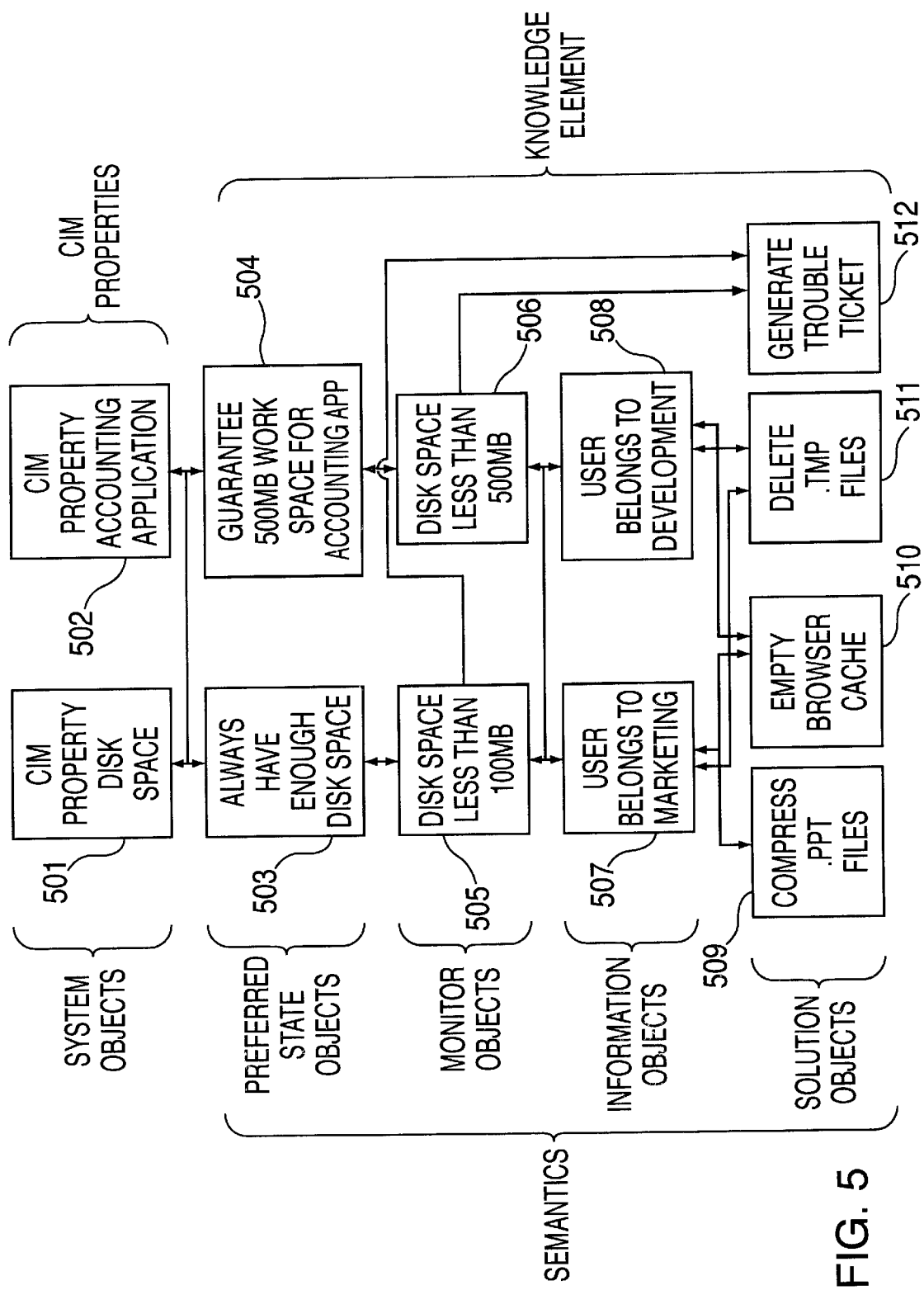
FIG. 5 is a block diagram illustrating the interactions amongst the various components of an exemplary knowledge element and selected CIM objects in accordance with the present invention.

The software system according to the present invention monitors the CIM objects and performs necessary actions based on the rules contained in the knowledge elements to maintain the preferred state, which rules may request information for the purpose of clarifying the context of the initial CIM data model by using heuristics and reasoning. The interactions amongst the various components of an exemplary knowledge element and selected CIM objects in accordance with the present invention is described below in conjunction with an example shown in FIG. 5. It should be noted that the interaction illustrated in FIG. 5 is purely exemplary and for the purpose of illustration only. As shown in FIG. 5, CIM properties may include "system objects" 501 and 502. The system object 501 describes the properties of the disk space, and the system object 502 describes applicable properties for an accounting application. The CIM properties defined by system objects 501 and 502 may be further qualified by using productions system rules (i.e., components of a knowledge element) to set restrictions and dependencies on the CIM properties, thereby specifying the "preferred state objects" 503 and 504. The preferred state object 503 stipulates that the memory disk should always have at least a predefined amount of free space, e.g., 100 MB; the preferred state object 504 stipulates that at least 500 MB of memory must be reserved for accounting application.

Interacting with the preferred state objects 503 and 504 are components of the knowledge element which monitor the CIM properties defined by the system objects 501 and 502 to determine whether the preferred state of a computer system is violated. This aspect of the knowledge element is represented by "monitor objects" 505 and 506 in FIG. 5. The monitor object 505 represents the condition in which the available disk space is less than 100 MB; the monitor object 506 represents the condition in which the available disk space is less than 500 MB. The knowledge element may also incorporate rules which request additional information, e.g., information regarding the user, as represented by "information objects" 507 and 508 in FIG. 5. For example, the information object 507 represents the condition in which the user belongs to the marketing department of an organization; the information object 508 represents the condition in which the user belongs to the product development department. In addition, the knowledge element may include multiple solution objects 509–512: a) solution object 509 for "compress the PowerPoint™ files"; b) solution object 510 for "empty the browser cache"; c) solution object 511 for "delete files from the temporary directory"; and d) solution object 512 for "generate trouble ticket." The solution objects are sets of data which direct the exact actions of the respective solution providers.

As shown in FIG. 5, the knowledge element represented by objects 503–512 provides semantic information to CIM properties represented by system objects 501 and 502 by: a) specifying the preferred state of the monitored computer system; b) determining whether the preferred state is violated; c) request additional information to clarify the context of the CIM properties by using heuristics and reasoning; and d) apply an appropriate solution. For example, if the operating system is not performing an accounting application, the available disk space is less than 100 MB, and the user information indicates that the user does not belong to either the marketing department or the product development department, then the knowledge element will execute the solution object 512 to generate a trouble ticket and send it to a "help desk" server (not shown). Similarly, if the operating system is performing an accounting application, the available disk space is less than 500 MB, and the user information indicates that the user does not belong to either the marketing department or the product development department, then the knowledge element will execute the solution object 512. In either one of the above two scenarios, however, if the user information indicates that the user belongs to either the marketing department or the product development department, the rules in the knowledge element determine which solution(s) among solution objects 509–511 should be executed: if the user in the product development department, the solutions to be executed are emptying the browser cache and deleting the .tmp files; if the user is in the marketing department, then the additional solution of compressing the .PPT (PowerPoint™) files is available. Furthermore, if the user information indicates that the user belongs to either the marketing department or the product development department, then the knowledge element may request additional information from the user, the CIM or the operating system before executing one or more of the solution objects 509–511.

Cube Builder

Figure 3:
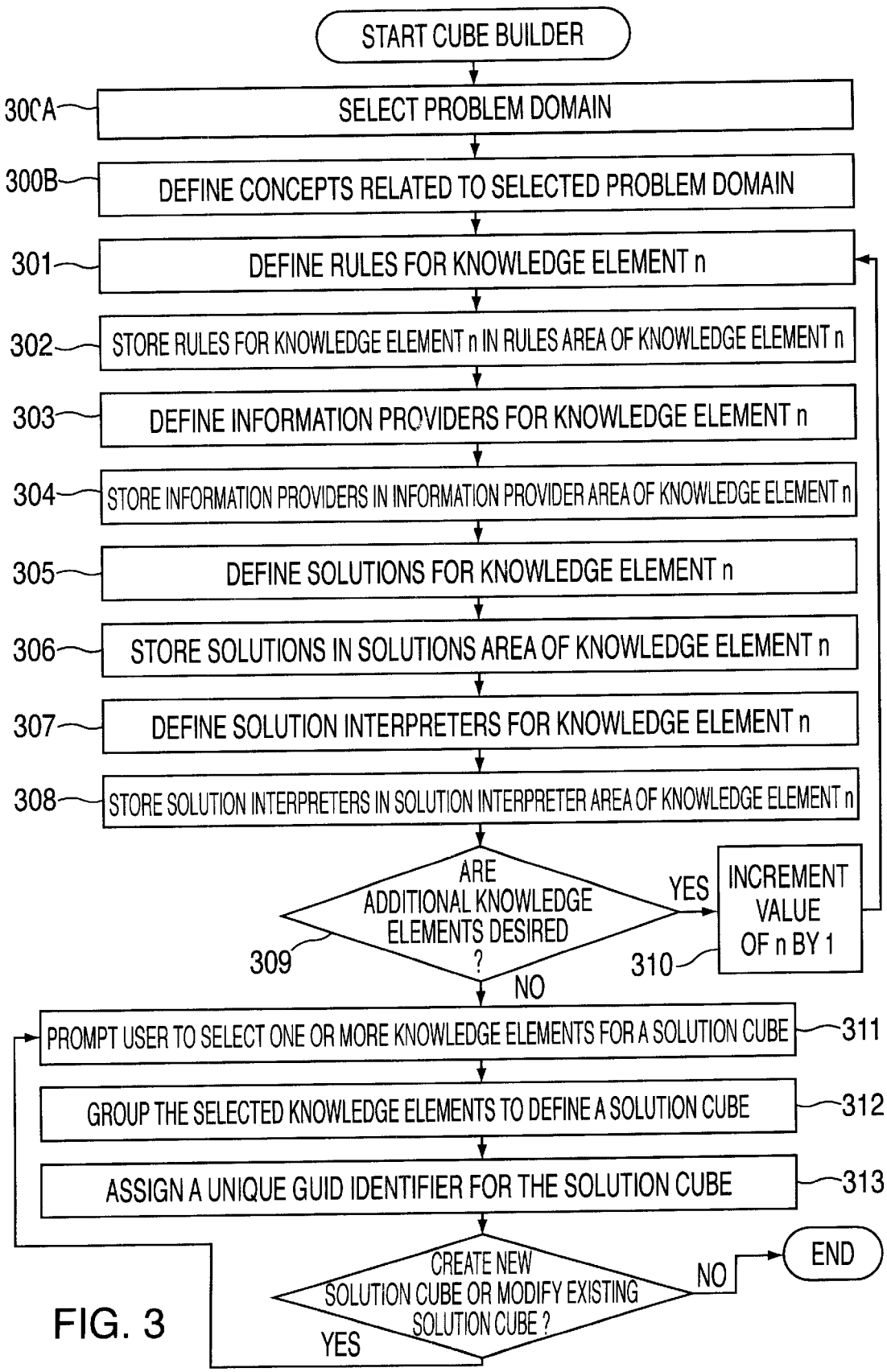
FIG. 3 is a flow chart illustrating the various exemplary steps of the "cube builder" methodology in accordance with the present invention.

The "cube builder," which is illustrated in the flowchart of FIG. 3, is a methodology for creating one or more of the above-described solution cubes. The cube builder methodology enables a user to package production-rules files and other files inputted by a user into "knowledge elements," which are in turn combined to form a solution cube for maintaining a predefined preferred state of a system, e.g., a computer system. In step 300A, the user selects a problem domain for which a solution cube will be constructed. In step 300B, the user defines key concepts related to the selected problem domain. Next, in steps 301 and 302 shown in FIG. 3, the cube builder methodology facilitates a user to define a set of production rules for a knowledge element n and store the rules in the rules area of the knowledge element n. Furthermore, in steps 303 and 304, different types of information providers via which the production rules for the knowledge element n may query information from various information sources are defined and stored. Similarly, in steps 305 and 306, the user may define one or more solutions for the knowledge element n and have the defined solutions stored in the solutions area of the knowledge element n. Next, in step 307, the user may define "solution interpreters" (or "solution provider") for interpreting. and executing the solutions defined in step 305, and the defined solution interpreters are stored in the solution interpreters area of the knowledge element n in step 308. Steps 301–308 may be repeated to create additional knowledge elements.

Continuing with the cube builder methodology shown in FIG. 3, in steps 311 and 312, the user may select one or more knowledge elements and group the selected knowledge elements to define a solution cube. In step 313, a unique GUID identifier is assigned to the solution cube. Steps 311–313 may be repeated to create additional solution cubes or modify an existing solution cube.

A brief example of how a programmer may utilize the cube builder methodology to create solution cube is illustrated here. For the purpose of this example, the programmer selects the problem of ensuring that users of a computer network can always print to the network printer. Once this problem domain has been selected, the programmer defines concepts related to the selected problem domain, some of which concepts may be chosen from the CIM, e.g., user, printer, print job, print queue, printer driver, etc. Next, the user utilizes the cube builder methodology to create production system rules that define the problem and solutions. In this example, the following rules will be pertinent: 1) Rule 1—when the solution cube starts up, monitor for print jobs to be added to a printer; 2) Rule 2—if the printer is an HP 5 si, and the printer driver was created before May 15, 1999, then the printer driver is out of date; 3) Rule 3—if a user submits a print job to a printer with a driver that is out of date, then notify the user that the printer driver is out of date, and it will be automatically updated; and 4) Rule 4—if a user submits a print job to a printer with a driver that is out of date, then update the printer driver. Once the production-system rules have been established, the user needs to identify from the rules what the relevant information providers are. Rule 1 requires retrieval of the print jobs, which can be facilitated by using the CIM information provider. Rule 2 requires obtaining the printer information and the printer driver information, which can be facilitated by using the CIM information provider. Next, the relevant solutions need to be identified based on the rules. Rule 3 requires notification to the user, which can be accomplished by an appropriate solution provider that runs an executable to notify the user. Rule 4 requires updating the printer driver, which can be accomplished by an appropriate solution provider that runs an executable to install a new printer driver. Finally, the cube builder methodology calls for packaging the production-system-rules files, information providers, solution providers, an executable to notify the user, an executable to install the new printer driver, and the printer driver file. The resulting file, or the solution cube, can then monitor, diagnose, and solve the printer problems.

The cube builder methodology is a very flexible framework which has several distinct advantages. First, because each of the individual knowledge elements that make up a given solution cube may be "state unaware," i.e., every component needed for the operation of the knowledge element is fully contained within the knowledge element, knowledge elements may be shared or reused by multiple solution cubes (a "distributed aggregation" characteristic), and knowledge elements may be aggregated in any desired combination to form a desired solution cube or modify an existing solution cube. For example, when an information-technology organization enters into a contract, e.g., a "Service Level Agreement" (SLA), to keep a computer network in a particular condition, the SLA may stipulate that: a) desktop computers will always have access to a printer; and b) a user will be adequately warned before the disk capacity is exhausted on any machine. Each of these components of the SLA is referred to as a Service Level Object (SLO), and any amendments to the SLA to include additional SLOs may be satisfied by simply adding corresponding knowledge elements.

In addition to the above-noted advantages, because each knowledge element may be created and tested in isolation from other knowledge elements, the time period required for development or modification of a solution cube to implement solutions to newly detected problem topics is significantly reduced in comparison to the development time period for conventional problem-resolution systems. In addition, the cube builder methodology according to the present invention facilitates creation and management of different components of the solution cube by different experts and organizations, which components may then be ultimately integrated in a solution cube.

Information Providers

As discussed above in connection with the solution cube and cube builder implementations, a programmer may define different types of information sources from which the production rules for a given knowledge element may query information. In order to facilitate a streamlined channeling of information to the production system, the software methodology according to the present invention implements the concept of "information providers," each of which is a provider module that retrieves information from a specific information source and shares a standardized interface methodology with the production system or production-rules file, thereby allowing implementation of a generalized query mechanism in the production system regardless of the actual physical implementation of the information source. Furthermore, the information-channeling mechanism between the production system 1 and the information providers 5a–5c enables the retrieved information to be asserted into the production system 1 as a set of facts in a standardized manner regardless of the physical implementation of the particular information source from which the information is obtained. The "information provider" implementation is discussed in further detail below in connection with FIGS. 2 and 4B.

As shown in FIG. 2, the production system 1 contains production-rules file 10 (specific examples of which are shown as files 403 and 404 in FIG. 4B) which may be used to diagnose and solve a particular set of problems, e.g., problems related to printing from a computer system. Before the production rules 10 can reach a conclusion about a detected problem, information about the state of the computer system, for example, may be required by the production rules as a set of facts. When the production rules 10 require particular information, the rules assert an "Information Request" 203. Each type of information request is associated with a predefined information source, e.g., CIM, the user or the operating system. When the Information Request is asserted, the interface 3 channels the Information Request to the appropriate information provider which in turn calls the specified object interface to retrieve the requested information. For the exemplary embodiment of the software system shown in FIG. 2, three different information providers are illustrated: information provider 5a for requesting information from the CIM; information provider 5b for requesting information from the user; and information provider 5c for requesting information from the operating system. The information provider 5a is a default information provider that can find information from the CIM, which represents several aspects of the computer system as abstract objects that can be queried using SQL-like database queries. By using the CIM information provider 5a, the production system 1 can find out information about the computer system. It should be noted that although the operating system information provider 5c is shown as a distinct module from the CIM information provider 5a for the purpose of illustrating this exemplary embodiment, the function performed by the operating system information provider 5c may be performed by the CIM information provider 5a. In addition, the information provider 5b facilitates communication with a user to request information.

As shown in FIG. 2, in response to the information request directed to the information provider 5a, the interface relays the information request as request 203a. The information provider 5a returns the requested information 204a from the CIM to the interface, and the interface 3 in turn asserts the retrieved information into the production system as a set of facts 204. Similarly, the interface relays the information requests directed to the information providers 5b and 5c as requests 203b and 203c, respectively, and the requested information 204b and 204c from the user and the operating system, respectively, are asserted into the production system as a set of facts 204.

A brief explanation regarding the common "interface" 3 is helpful here. It should be noted that the common "interface" 3 is not a module which is distinct and separate from the information providers, but rather implemented in the form of standardized methods which are utilized by each information provider. Each information provider implements the following two methods:

---

Copyright 1999 Intel Corporation

Information Provider Common Interface

---

ResultCode GetInfo(InformationRequest I, KnowledgeContext k)

The GetInfo method takes Information Request and KnowledgeContext objects as parameters. The InformationRequest itself has attributes that can be queried to find the details of the information request. The InformationRequest object minimally supports the following methods.

GetRequestType() returns the type of information that is being requested.

GetAttributeValue(String attributename) returns the value of a particular named attribute of the information request.

The KnowledgeContext object contains methods that allow information to be asserted into the production system. The KnowledgeContext object minimally supports the following method.

AssertFact(Fact newFact) asserts the given fact into the production system.

String GetName()

This simply returns the name of the information source for display purposes.

---

An example of how GetInfo might be implemented can be shown using pseudo-codes provided below for the information providers 5a–5c shown in FIG. 2 and the information provider 409 shown in FIG. 4B.

---
Copyright 1999 Intel Corporation
CIM Information Provider 5a
---

1. Call the GetRequestType method on the InformationRequest object to ensure that this request is a CIM information request.
2. Call the GetAttributeValue method of the InformationRequest to get the value of the "CIM Query" attribute.
3. Use CIM to execute the given query.
4. For each of the objects returned from CIM, create a fact object, and assert the fact into the production system using the AssertFact method of the KnowledgeContext object.
5. Return a successful result code from the GetInfo method.

---

Copyright 1999 Intel Corporation
User-Input Information Provider 5b

1. Call the GetRequestType method on the InformationRequest object to ensure that this request is a user in put request.
2. Call the GetAttributeValue method of the InformationRequest to get the value of the "Question Descriptions" property.
3. Call the GetAttributeValue method of the InformationRequest to get the value of the "Timeout" property.
4. Generate a dialog box that asks each of the questions described in the Question Descriptions property.
5. Display the dialog box to the user, and wait for input.
6. Formulate a fact object that represents the answers that the user gave to the questions, and assert the fact into the production system using the AssertFact method of the KnowledgeContext object.
7. Return a successful result code from the GetInfo method.
8. If the user does not respond to the dialog box within the specified timeout, then close the dialog box and return a failure result code from the GetInfo method.

Copyright 1999 Intel Corporation
Operation-System Information Provider 5c

1. Call the GetRequestType method on the InformationRequest object to ensure that this request is an operating system information request.
2. Call the GetAttributeValue method of the InformationRequest to get the value of the "CIM Query" attribute.
3. Pass the supplied query to the CIM framework.
4. For each object that was returned from CIM, create a fact object, and assert the fact into the production system using the AssertFact method of the KnowledgeContext object.
5. Return a successful result code from the GetInfo method.

Copyright 1999 Intel Corporation
Printer Information Provider 409

1. Call the GetRequestType method on the InformationRequest object to ensure that this request is a printer information request.
2. Call the GetAttributeValue method of the InformationRequest to get the value of the "Printer Name" attribute.
3. Use operating system functions or SNMP (Simple Network Management Protocol) to find the state of the named printer.
4. For the printer state that was returned, create a fact object, and assert the fact into the production system using the AssertFact method of the KnowledgeContext object.
5. Return a successful result code from the GetInfo method.

Once an information provider has been defined, it is also identified by a GUID, and the information provider may be invoked by the production system via a set of rules. Referring to the example previously discussed in connection with FIG. 5, the set of rules for invoking a particular information provider may be: 1) if an accounting application is launched, then query for the state of all system disks; 2) if a query is requested for all system disks, then assert a CIM information request using the query "Select * From CIM_LogicalDisk"; and 3) if a CIM information request is proposed, then use the information provider with GUID=<some GUID>. Once the relevant information provider has asserted the information regarding the state of each system disk, then other rules of the production system may be activated, for example: if free disk space of any disk falls below 100 MB, then propose an executable solution using the file deletefiles.exe and wait for the program to complete.

In addition to the previously mentioned advantages of the "information provider" implementation in accordance with the present invention, another advantage of using the "information provider" implementation as shown in FIG. 2 is that certain information requests can be overridden dynamically and satisfied by alternate information sources. If, for example, the production system 1 is directed to monitoring and ensuring a predefined condition for the printer, several different rules within the production system may request printer information, e.g., from the CIM. Should the user of the production system subsequently decide that he or she would like to be asked any information about the printer, instead of having the information request go directly to the CIM, only one more rule would be need to be added by the user: any time there is a CIM information request for information about the printer, retract the CIM information request, and assert a user information request instead.

Solution Providers

As discussed in the "Solution Cube" and "Cube Builder" sections of this specification, and as shown in FIG. 1, the software system according to the present invention incorporates the "solution providers" (or "solution interpreters") 4a–4c, each of which is a provider that can interpret a requested solution, perform it, and notify the production system when the solution has been completed, as well as notify the production system of any results. The production system loads an appropriate solution interpreter and uses a common interface to request that a particular solution be executed. Each solution provider includes the particular set of logic representing the relevant solution.

In the production system 1 shown in FIG. 1, the production rules 10 may assert several different types of solutions to be executed, depending on the status of the monitored system, e.g., the properties of CIM objects representing a computer system. Each type of requested solution, generically represented by reference numeral 103, is associated with a particular solution provider. In the exemplary embodiment of the software system illustrated in FIG. 1, four different types of solution providers are presented: a) solution provider 4a which can run executable programs; b) solution provider 4b which can run script files; c) solution provider 4c for sending a trouble ticket to a "help desk" server when the encountered problem cannot be solved using other alternative solutions; and d) solution provider 4d which can post a message to the logged in user. Furthermore, similar to the common interface 3 for the information providers, the common interface 6 is implemented for the solution providers 4a–4d in the form of standardized methods which are utilized by each solution provider. Each solution provider implements the following two methods:

---

Copyright 1999 Intel Corporation
Solution Provider Common Interface

---

ResultCode ApplySolution(Solution s)
    The ApplySolution method takes a solution object as a parameter. The Solution object itself has attributes that can be queried to find the details of the solution. The Solution object minimally supports the following methods.
        GetSolutionType() which returns the type of solution (run an executable, send a trouble ticket, etc.)
        GetAttributeValue(String attributeName) returns the value of a particular named attribute.
        ExecuteAsynchronously() which returns true if this solution is supposed to return immediately as soon as the solution has been started.
        SetResults() which can be called to set the results of the solution.
String GetName()
    This simply returns the name of the solution provider for display purposes.

---

The pseudo-code descriptions of the solution providers 4a–4d are provided below:

---

Copyright 1999 Intel Corporation
Solution Provider 4a "run an executable program"

---

1. Call GetSolutionType on the solution object to double check that it is of type "executable solution"
2. Call GetAttributeValue on the solution to get the value of "executableFilePath"
3. Call ExecuteAsynchronously on the solution to determine if this interpreter is supposed to wait for the solution to complete before returning.
4. Run the executable program.
5. Wait for it to complete if ExecuteAsynchronously returned False.
6. Set the results of the solution by calling the SetResults method.
7. Return a successful result code from the ApplySolution method.

Copyright 1999 Intel Corporation
Solution Provider 4b "run a script file"

---

1. Call GetSolutionType on the solution object to double check that it is of type "script solution".
2. Call GetAttributeValue on the solution to get the value of "scriptFilePath"
3. Call ExecuteAsynchronously on the solution to determine if this interpreter is supposed to wait for the solution to complete before returning.
4. Query the operating system to determine which executable program can run the specified script.
5. Launch the executable program passing the script as a parameter.
6. Wait for it to complete if ExecuteAsynchronously returned False.
7. Set the results of the solution by calling the SetResults method.
8. Return a successful result code from the ApplySolution method.

-continued

Copyright 1999 Intel Corporation
Solution Provider 4c "send a trouble ticket to a help desk server"

1. The solution provider receives a request to perform a solution
2. The solution provider examines the request to determine the server to which the trouble ticket should be sent
3. The solution provider examines the request to gather the problem description
4. The solution provider examines the request to determine the location/component in which the error occurred
5. The solution provider examines the request to determine the severity of the problem
6. The solution provider examines the request to determine the list of solutions which have already been attempted
7. The solution provider formulates a trouble ticket file, using the information gathered from the solution request
8. The solution provider sends the trouble ticket file to the specified server
9. The solution provider returns a success code Copyright 1999 Intel Corporation
Solution Provider 4d "post a message to the logged-in user"

1. Call GetSolutionType on the solution object to double check that it is of type "send message to user".
2. Call GetAttributeValue on the solution to get the value of "messageText"
3. Call ExecuteAsynchronously on the solution to determine if this interpreter is supposed to wait for the user to respond to the message before returning.
4. Pop up a dialog box to the currently logged in user with containing the text described in the "messageText" attribute.
5. Wait for the user to acknowledge the message if ExecuteAsynchronously returned False.
6. Set the results of the solution by calling the SetResults method.
7. Return a successful result code from the ApplySolution method.

Once a solution provider has been defined, it is also identified by a GUID, and the solution provider may be invoked by the production system via a couple of rules. Referring to the example previously discussed in connection with FIG. 5, the set of rules for invoking a particular solution provider may be: 1) if free disk space of any disk falls below 100 MB, then propose an executable solution using the file deletefiles.exe and wait for the program to complete; and 2) if an executable solution is proposed, then use the solution provider with GUID=<some GUID>.

The software methodology according to the present invention channels the solution request from the production system 1 via the common interface 6 to the appropriate solution provider, e.g., the solution request 103a for "run an executable file" is channeled to solution provider 4a, as shown in FIG. 1. The selected solution provider then executes the requested solution and returns any results, e.g., result 104b from the solution provider 4a, to the common interface 6, which in turn channels the result to production system 1 as facts 104. Similarly, solution requests for solution providers 4b ("run a script file"), 4c ("send a trouble ticket to a help desk server") and 4d ("post message to the logged-in user") are channeled as requests 103b, 103c and 103d, respectively, by the interface 6. Results 104b, 104c and 104d returned from solution providers 4b, 4c and 4d, respectively, are received by the interface 6 and asserted into the production system 1 as facts 104.

When the production system rules request solutions to be executed, the rules may specify whether to run the requested solution "synchronously" or "asynchronously." If the requested solution is executed synchronously, then any further rule processing stops until the requested solution has been completed. On the other hand, if the requested solution is executed asynchronously, rule processing can continue as soon as the requested solution has been "launched.," i.e., when the solution request is sent by the rules and the solution provider starts to run the solution, and the results of the requested solution are asserted into the production system at a later time.

Because all solution providers according to the present invention share a common interface with the production system, adding additional solution providers is simple. In addition, the common interface allows developers to implement a generalized solution mechanism in the production system regardless of the actual physical implementation of the solution provider. The software methodology according to the present invention also eliminates the need for the developer to understand the details of the internal operation of the particular production system. In addition, certain programmed solutions can be overridden or postponed as desired by a particular user. If, for example, a production system is created to keep a certain amount of a computer system's memory-disk space free, then some of the available solutions may be to delete different types of files from the computer system's temporary directory, as illustrated in FIGS. 4 and 5. If the user of the production system later decides that they would like to be asked before the system automatically deletes any files, then the user simply needs to add a couple of additional rules. The additional rules would be: a) any time the production system requests a solution to delete files from the temporary directory, query the user; and b) if the solution requested by the production system is to delete files from the temporary directory, and the user has not allowed this activity, then retract the solution. In this manner, the user may dictate whether or not a particular solution should be executed.

While the software system and method according to the present invention have been described above in connection with specific embodiments and steps, it should be readily apparent to those of ordinary skill in the are that the above-described embodiments and steps are exemplary in nature since certain changes may be made thereto without departing from the teachings of the invention, and the exemplary embodiments and steps should not be construed as limiting the scope of protection for the invention as set forth in the appended claims. For example, while an exemplary sequence of steps for the cube-builder methodology was illustrated in connection with FIG. 3, the solution cubes described in this application may be constructed via other methodologies or methodologies modified from the cube builder methodology of FIG. 3. Furthermore, while the solution cube in accordance with the present invention has been described as containing the relevant solution providers and information providers, these solution providers and information providers may be provided as parts of the problem-resolution framework separate from the solution cube. Accordingly, the specification and the drawings are to be regarded in an illustrative, rather than restrictive, sense.

I claim:

1. A computer-readable medium for storing a solution cube defined by a plurality of instruction sets for maintaining a preferred state of a monitored system, said plurality of instruction sets comprising:

production-system instruction sets specifying the preferred state of the monitored system and a plurality of solutions for returning the monitored system to the preferred state in case the preferred state is violated;

a plurality of solution interpreters corresponding to said plurality of solutions for executing said solutions, all of said solution interpreters having a first uniform interface mechanism for interfacing with said production-system instruction sets.

2. The computer-readable medium of claim 1, wherein said first uniform interface mechanism comprises the following instruction sets:

an instruction set for verifying the type of solution which has been selected;

an instruction set for verifying whether the selected solution is to be executed asynchronously; and an instruction set for setting results of the selected solution.

3. The computer-readable medium of claim 2, wherein said production-system instruction sets comprise production-system rules which are operated on by a production-system engine.

4. The computer-readable medium of claim 3, wherein said medium is one of a floppy disk, a computer hard disk, a zip-drive disk, a CD-ROM and a DVD-ROM.

5. The computer-readable medium of claim 3, wherein said production-system instruction sets further comprise said production-system engine.

6. The computer-readable medium of claim 1, wherein said production-system rules further specify a plurality of requests for information from a corresponding plurality of information sources, said plurality of instruction sets further comprising:

a plurality of information providers corresponding to said plurality of information sources for providing information in response to said information requests, all of said information providers having a second uniform interface mechanism for interfacing with said production-system instruction sets.

7. The computer-readable medium of claim 6, wherein said production-system instruction sets comprise production-system rules which are operated on by a production-system engine.

8. The computer-readable medium of claim 7, wherein said medium is one of a floppy disk, a computer hard disk, a zip-drive disk, a CD-ROM and a DVD-ROM.

9. The computer-readable medium of claim 7, wherein said production-system instruction sets further comprise said production-system engine.

10. The computer-readable medium of claim 6, wherein said first uniform interface mechanism comprises the following instruction sets:

an instruction set for verifying the type of solution which has been selected;

an instruction set for verifying whether the selected solution is to be executed asynchronously; and an instruction set for setting results of the selected solution.

11. The computer-readable medium of claim 10, wherein said production-system instruction sets comprise production-system rules which are operated on by a production-system engine.

12. The computer-readable medium of claim 10, wherein said second uniform interface mechanism comprises the following instruction sets:

an instruction set for verifying the type of information which has been requested; and an instruction set for asserting the requested information.

13. A method of maintaining the preferred state of a monitored system comprising:

specifying by a first portion of production-system instruction sets a preferred state of the monitored system;

specifying by a second portion of production-system instruction sets a plurality of solutions for returning the monitored system to the preferred state in case the preferred state is violated;

specifying a plurality of solution interpreters corresponding to said plurality of solutions for executing said solutions;

specifying a first uniform interface mechanism for said plurality of solution interpreters for interface between said solution interpreters and said production-system instruction sets;

selecting at least one of said plurality of solutions when the preferred state of the monitored system is violated;

invoking via said first uniform interface a solution interpreter corresponding to said selected solution;

executing the selected solution.

14. The method of claim 13 further comprising: notifying said production-system instructions sets via said first uniform interface results of executed solution.

15. The method of claim 14, wherein said step of executing the selected solution comprises:

interpreting said selected solution with a corresponding solution interpreter; and executing said selected solution with a production-system-engine portion of said production system instruction sets.

16. The method of claim 14 further comprising, before the step of selecting at least one of said plurality of solutions:

specifying by a third portion of production-system instruction sets a plurality of information requests from a corresponding plurality of information sources;

specifying a plurality of information providers corresponding to said plurality of information requests for executing said requests; and specifying a second uniform interface mechanism for said plurality of information providers for interface between said information providers and said production-system instruction sets.

17. The method of claim 16 further comprising, before the step of selecting at least one of said plurality of solutions:

selecting at least one of said information requests as a function of said first portion of production-system instruction sets;

invoking via said second uniform interface an information provider corresponding to said selected information request;

executing said selected information request; and notifying said production-system instructions sets via said second uniform interface results of executed information request.

18. The method of claim 17, wherein said step of executing the selected information request comprises:

interpreting said selected information request with a corresponding information provider; and obtaining requested information.

19. A system for maintaining a preferred state of a monitored system, which comprises:

a processor for executing instructions;

at least one computer-readable medium for storing a plurality of instructions sets for execution by said processor for maintaining the preferred state of a monitored system, said plurality of instruction sets having:

production-system instructions sets specifying a preferred state of the monitored system and a plurality of solutions for returning the monitored system to the preferred state in case the preferred state is violated; and a plurality of solution interpreters corresponding to said plurality of solutions for executing said solutions, all of said solution interpreters having a first uniform interface mechanism for interfacing with said production-system instruction sets.

20. The system of claim 19, wherein said system has a first computer-readable medium and a second computer-readable medium, and wherein said production-system instruction sets comprise production-system rules stored on said first computer-readable medium and a production-system engine for operating on said production-system rules, said production-system engine being stored on said second computer-readable medium.

21. The system of claim 20, wherein said first computer-readable medium is one of a floppy disk, a computer hard disk, a zip-drive disk, a CD-ROM and a DVD-ROM, and said second computer-readable medium is one of a floppy disk, a computer hard disk, a zip-drive disk, a CD-ROM and a DVD-ROM.

22. The system of claim 19, wherein said production-system instruction sets comprise production-system rules and production-system engine for operating on said production-system rules, wherein said production-system rules further specify a plurality of requests for information from a corresponding plurality of information sources, said plurality of instruction sets further comprising:

a plurality of information providers corresponding to said plurality of information sources for providing information in response to said information requests, all of said information providers having a second uniform interface mechanism for interfacing with said production-system instruction sets.

23. The system of claim 22, wherein said first uniform interface mechanism comprises the following instruction sets:

an instruction set for verifying the type of solution which has been selected;

an instruction set for verifying whether the selected solution is to be executed asynchronously; and an instruction set for setting results of the selected solution.

24. The system of claim 23, wherein said second uniform interface mechanism comprises the following instruction sets:

an instruction set for verifying the type of information which has been requested; and an instruction set for asserting the requested information.

25. A method of providing semantic information to an instruction set which is stored on a computer-readable medium and which defines a common information model for a monitored system, comprising:

specifying by a first portion of production-system rules a preferred state of the monitored system;

monitoring the common information model of the monitored system;

specifying by a second portion of production-system instruction sets at least one solution for returning the monitored system to the preferred state in case the preferred state is violated;

specifying by a third portion of production-system rules at least one information request for clarifying the monitored common information model, said at least one information request being invoked as a function of said first portion of production-system rules.

26. A method of creating a solution cube for maintaining a preferred state of a monitored system, said solution cube having at least one knowledge element defined by a plurality of instruction sets stored on a computer-readable medium, comprising:

a) defining a first portion of production-system instruction sets for said at least one knowledge element, said production rules specifying one of a portion or whole of said preferred state;

b) defining by a second portion of production-system instruction sets a plurality of solutions for said at least one knowledge element;

c) defining a plurality of solution interpreters for interpreting said plurality of solutions, said plurality of solution interpreters having a first standardized interface mechanism for interfacing with said production-system instruction sets; and d) assigning a unique identifier to said solution cube.

27. The method of claim 26 further comprising, before step b):

defining at least one information request from a corresponding information source, said at least one information request to be invoked as a function of said first portion of production-system instruction sets;

defining an information provider corresponding to said information source for providing information in response to said at least one information request, said information provider having a second standardized interface mechanism for interfacing with said production-system instruction sets.

28. The method of claim 26 further comprising, between steps c) and d):

repeating steps a) through c) if an additional knowledge element is desired; and grouping said at least one knowledge element and said additional knowledge element to define said solution cube.

\* \* \* \* \*

UNITED STATES PATENT AND TRADEMARK OFFICE
CERTIFICATE OF CORRECTION

PATENT NO. : 6,553,360 B1
DATED : April 22, 2003
INVENTOR(S) : Matthew E. Hoekstra It is certified that error appears in the above-identified patent and that said Letters Patent is hereby corrected as shown below:

Column 20,
Lines 40-41, change "said step of executing the" to -- said executing the --.
Lines 47-48 and 59-60, change "before the step of selecting" to -- before the selecting --.

Column 21,
Lines 5-6, change "said step of executing the" to -- said executing the --.

Column 22,
Lines 42-43, change "before step b):" to -- before b): --.
Lines 54-55, change "between steps c and d):" to -- between c) and d): --.
Line 56, change "repeating steps a) through c)" to -- repeating a) through c) --.

Signed and Sealed this

Eighth Day of June, 2004

JON W. DUDAS
*Acting Director of the United States Patent and Trademark Office*